(12) United States Patent
Whan et al.

(10) Patent No.: US 6,469,624 B1
(45) Date of Patent: Oct. 22, 2002

(54) NON-OBTRUSIVE WEAPON DETECTION SYSTEM

(75) Inventors: Wen J. Whan, Taipei (TW); George V. Keller, Golden, CO (US)

(73) Assignee: 3-J Tech., Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/476,339

(22) Filed: Jan. 3, 2000

(51) Int. Cl.[7] .............................................. G08B 13/24
(52) U.S. Cl. ......................... 340/551; 324/239; 324/243
(58) Field of Search ................................. 340/551, 552, 340/568.1; 324/239, 243, 240, 241, 242, 326, 237, 328

(56) References Cited

U.S. PATENT DOCUMENTS

| | | | |
|---|---|---|---|
| 3,707,672 A | * 12/1972 | Miller et al. | 324/41 |
| 4,894,619 A | * 1/1990 | Leinonen et al. | 324/329 |
| 5,121,105 A | * 6/1992 | Aittoniemi | 340/572 |
| 5,414,411 A | * 5/1995 | Lahr | 340/568 |
| 5,552,705 A | * 9/1996 | Keller | 324/239 |

* cited by examiner

Primary Examiner—Anh La
(74) Attorney, Agent, or Firm—Edwin H. Crabtree; Ramon L. Pizarro; Donald W. Margolis

(57) ABSTRACT

An improved non-obtrusive weapon detection system and method used in discriminating between a concealed weapon made of a ferromagnetic material. The system provides a high probability of detection of hand guns and other types of weapons with a low false alarm rate. The detection of the weapon is accomplished by measuring a total electromagnetic field. The total field being the sum of an incident electromagnetic field and an electromaetic field scattered from the object. The system uses a magnetic field transmitter, which transmits a low intensity electromagnetic signal. The electromagnetic signal illuminates a volume wherein the weapon, called a target, may or may not be carried by a person. The electromagnetic signal is in a form of a sudden steplike change in a constant magnetic field, called a "time-domain" excitation. The waveform or step pulse of the time-domain excitation is called a Heaviside step pulse. The step pulse creates two signals, which are analyzed and digitally processed using a preprogrammed computer. The analyzed information allows an observer to identify the target as being threatening or non-threatening.

20 Claims, 2 Drawing Sheets

NON-OBTRUSIVE WEAPON DETECTION SYSTEM

BACKGROUND OF THE INVENTION (a) Field of the Invention

This invention relates to a system and method for detecting different types of metal objects and more particularly, but not by way of limitation, to a non-obstructive weapon detection system which allows an observer to discriminate between a handgun made of a ferromagnetic material and other objects carried by a person.

(b) Discussion of Prior Art

In the past, gun detection became an important technological requirement in the 1960s with the first occurrences of hijacking of commercial aircraft by armed terrorists. In short order, an electromagnetic gun detection system was developed and deployed at airports around the World. The technology used was basic, with the gun detector being no more than a coil of wire wrapped around a frame through which a passenger desiring to board an aircraft had to pass. The loop was instrumented to measure a quantity, the impedance of the loop, that was monitored on a control panel. If a person carrying a gun were to pass through the portal, the electromagnetic field from the coil would induce currents in the gun. This extraction of energy would appear on a monitor as a change in impedance of the coil and trigger an alarm. The alarm indicating that the individual was carrying some metallic object and should be searched.

The above mentioned metal detection system has been strikingly successful, even though it cannot truthfully be called a gun detection system. The system merely indicates that a person is carrying some small metal article on his person and serves as a cause for that person to be physically searched. The search is the true act of gun detection. The electromagnetic scanning serves only to select the most likely candidates for a physical search. But, this is enough of a deterrent that very few people are found carrying handguns on attempting to board an aircraft. Over the past three decades, the rate of gun detection has been about 1 in 100,000 people and these have almost always been individuals with a legitimate need and who overlook the procedures required to carry a handgun on board the aircraft.

More modern versions of airport gun detection systems are improved over the earlier systems but are not significantly different in their capabilities. But, because they have been very effective, there has not been a need for significant changes in airport gun detection systems. However, there are other arenas in which guns pose an even more dangerous threat to the public welfare. These gun threats being in the commission of armed robbery, in acts of political terrorism and in peacekeeping operations in unstable countries. In these situations, the airport gun detection systems have not been effective.

The limitation to the general use of electromagnetic gun detection is that the cooperation of the public must be complete. People choosing to board an aircraft are as concerned with gun detection as the authorities and so are willing and even anxious to divest themselves for a few moments of the metallic objects they are carrying, queue up for passage through the gun detection portal and then go on about their business. In everyday life, very few people are willing to do this, and the ones who are willing, do not carry handguns. Thus, electromagnetic gun detectors have met with essentially a zero level of acceptance by the public. Further, those business establishments that have employed them, use them only rarely because they don't wish to discourage customers from entering their business.

Perhaps, wider acceptance of electromagnetic gun detection systems outside an airport setting could be achieved by the development of a system which is discrete. By this, the presence and operation of the system is not obvious to persons being scanned and the system provides a highly reliable discrimination against non-gun metal objects. The subject invention described herein is intended to meet these objectives.

In U.S. Pat. No. 5,552,705 to one of the subject inventors, a non-obtrusive weapon detection system and method for discriminating between a concealed weapon and other metal and non-metal objects is disclosed. In this patent, the detection system describes the use of transmitting low intensity electromagnetic step pulses which cause eddy currents to flow in a metal object under observation. The eddy currents create a plurality of scattered signals which are sufficient to plot a "decay curve" due to the relaxation of the eddy currents. A receiver is used to detect the scattered signals from the eddy currents. Computer equipment is used to digitally process the scattered signals for defining the decay curve. The decay curve provides an accurate determination of the conductive properties of the object under surveillance. This processed information allows an observer to identify the object under surveillance as either threatening or non-threatening.

The subject invention measures both the scattered signals from the eddy currents and a magnetization field signal of the object under observation for an improved weapon detection system. Also the new system and method measures a "crossover" point at which the magnetization signal and the induction current signal are of the same amplitude but opposite in sign.

Heretofore, there have been a variety of patents describing the use of electromagnetic detection systems in underground mining applications and exploration. In U.S. Pat. Nos. 5,260,660, 5,185,578, 5,066,917 and 4,994,747 by Stolarczykz, apparatus and methods of detecting underground electrically conductive ore bodies and ore zones are disclosed using transmitted electromagnetic energy. Both downhole receivers and downhole transmitters are used in these detection systems.

In U.S. Pat. Nos. 4,821,023 and 4,866,424 to Parks, a current state-of-the-art walk-through metal detector using electromagnetic waves for detecting weapons is described. The metal detector is typical of the detection systems found at airports, court houses and other buildings requiring this type of security system. In U.S. Pat. No. 4,821,023 to Ziolkowski, the use of wave propagation equations is described for producing localized pulses of wave energy. In U.S. Pat. No. 4,978,920 to Mansfield et al., a magnetic screen is developed using a coil surrounded by a set of the electrical conductors. The conductors are placed in a specific region in space.

None of the above mentioned patents specifically describe the a system and method of improved detection of hand guns and other types of weapons made of ferromagnetic material with a low false alarm rate. The improved detection system accomplished by measuring a total electromagnetic field. The total electromagnetic field being the sum of both an incident electromagnetic field and an electromagnetic field scattered from the object.

SUMMARY OF THE INVENTION

In view of the foregoing, it is a primary object of the present invention to provide a non-obtrusive weapon detection system which can accurately discriminate between different types of weapons and other objects carried on a person, carried in packaging, luggage, storage containers and other transportation means where different types of weapons may be hidden or smuggled.

Another object of the invention is a person under surveillance need not be aware that he or she is being monitored. The system provides for detection without invading a person's privacy.

Still another object of the system and method of detection is the increased high probability of detecting a weapon made of ferromagnetic material with a low false alarm rate. The weapon detection system is designed to discriminate between a concealed weapon and other metal and non-metal objects passing through an area where they are illuminated by an electromagnetic field.

Yet another object of the invention is unlike today's obtrusive metal detectors, a person is not required to turn over metal objects carried on the person to a security guard or to walk through a portal in order to determine the presence of a potentially dangerous metal object. The subject detection system can be used in various applications in public and private buildings, large and small gathering areas along with other types of military and non-military security requirements.

The subject improved weapon detection system includes a magnetic field transmitter which transmits a low intensity electromagnetic signal. The electromagnetic signal illuminates a volume or space wherein the weapon, called a target, may or may not present and carried by a person, in luggage, packaging, etc. The electromagnetic signal is in a form of a sudden steplike change in a constant magnetic field, called a "time-domain" excitation. If a ferromagnetic weapon is detected, a transient waveform is generated by a time-domain excitation. The newly created transient waveform is in the form of two signals. The two signals include a magnetization field signal and a scattered eddy current signal. A receiver is used for detecting the magnetization field signal, the eddy current signal and a crossover point of the step pulse. The two signals and the crossover point are analyzed and digitally processed using a preprogrammed computer. The processed information is then compared with similar values of weapons and non-weapons in a stored data base in the computer to predict the nature of the target. The analyzed information allows an observer to identify the target as being a threatening weapon made of a ferromagnetic material or a non-threatening metal or non-metal object.

These and other objects of the present invention will become apparent to those familiar with electromagnetic detection systems and weapon detection systems as described in the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

The basic theory for electromagnetic weapon detection and identification is described in detail in columns 2, 3, 4 and 5 of U.S. Pat. No. 5,552,705 to George V. Keller. Dr. Keller is one of the inventors of the subject application. This material is incorporated herein by reference. Also, the description of using low frequency electromagnetic fields based on Maxwell's equations are illustrated in the Keller patent. Further, a discussion of computing a magnetic field scattered from a small conductive mass when energized with a low frequency electromagnetic field is analyzed in detail by Kaufman and Keller as published in reference publication to Kaufmann A. A., and Keller, G. V., 1985, title, Inductive Mining Prospecting, Part 1: Theory: Elsevier, Amsterdam 620 pp.

Figure 1:
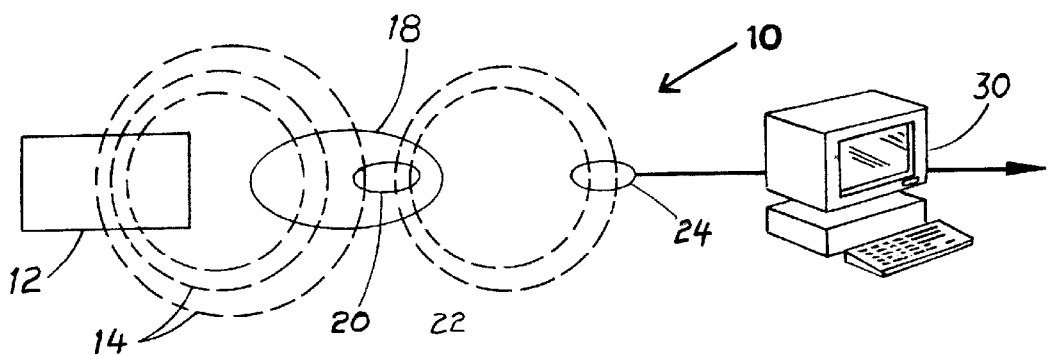
FIG. 1 is a schematic of the electromagnetic weapon detection system.
Figure 2:
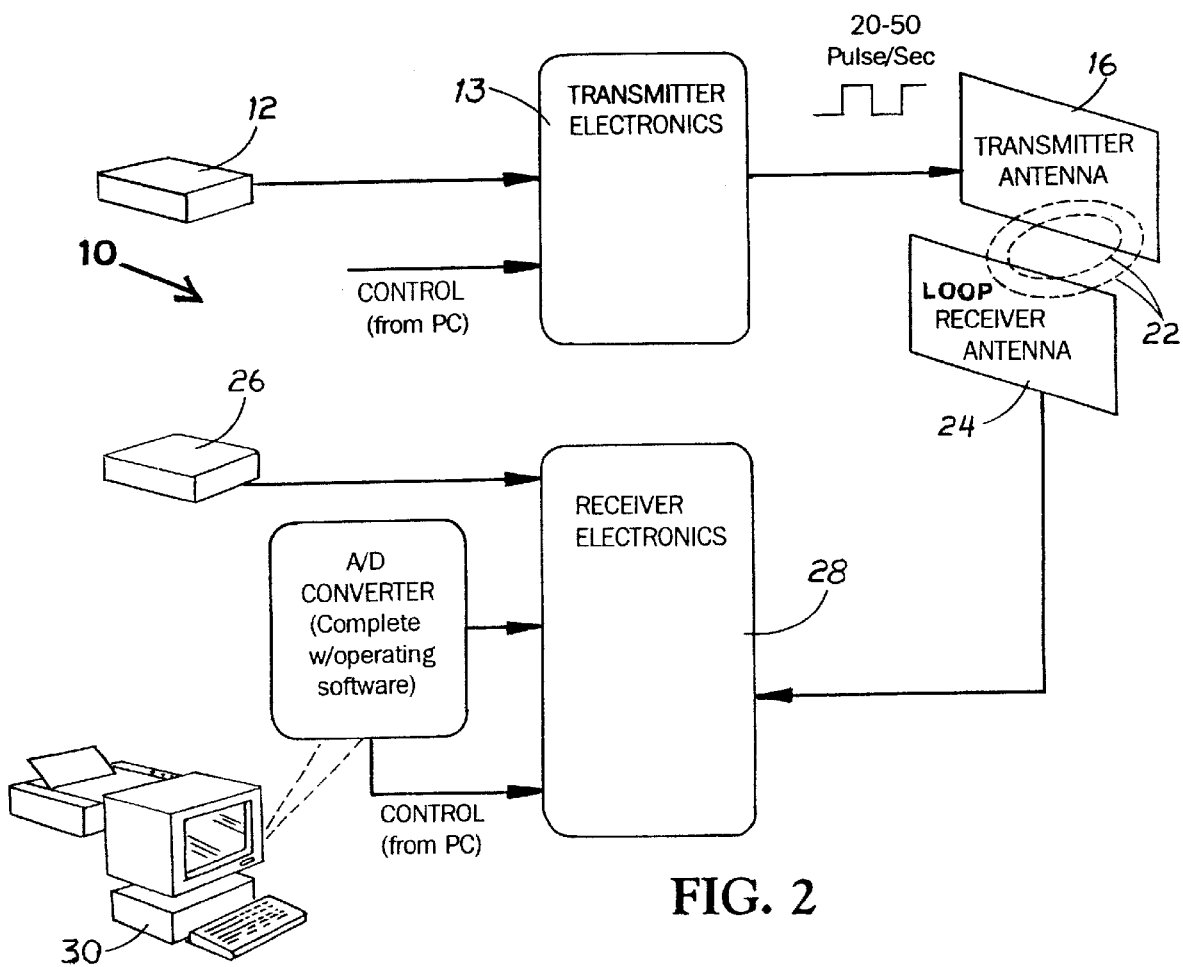
FIG. 2 is a more detailed schematic of the detection system including a transmitter and receiver electronics and transmitter and receiver antennas

In FIGS. 1 and 2, schematics of the electromagnetic weapon detection system are shown with the system having general reference numeral 10. The system 10 includes a transmitter 12 for generating an electromagnetic signal in the form of a Heaviside step pulse. The transmitter 12 includes solid state electronics 13 with a switch with a 10 usec risetime, a step pulse former with 20 to 50 pulses per second and rated for 20 to 60 ampere. The step pulse is shown as follows:

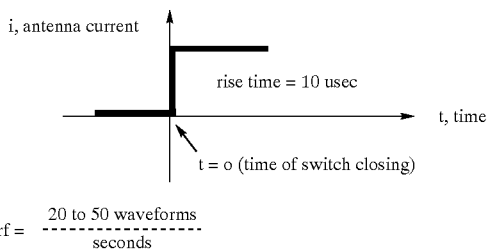

The 20 to 50 pulses per second of electromagnetic signals are shown as dashed rings 14 in FIG. 1. The rings 14 emanate from the transmitter antenna 16 shown in FIG. 2. A solid ring 18 indicates an interrogated volume 18. For example, the interrogated volume 18 might be an entrance area to a store or bank, a walkway between buildings, a departure area at an airport, the boarding area of a bus, etc.

A temporal change in the electromagnetic wave field causes current to flow in a metal object 20. The metal object is also referred to as a target and made of ferromagnetic material. Scattered electromagnetic signals are shown as dashed rings 22 emanating from the metal object 20. The scattered electromagnetic signals 22 have the form of branches of an exponential curve, with a time constant that is a function of the size, shape and material composition of the metal object 20 observation. It should be mentioned, as described above, not only is the scattered eddy current signal observed but also the magnetization signal is observed along with the crossover point of the electromagnetic signals 22.

The scattered electromagnetic signals 22 are detected by a loop receiver antenna 24 or other fast response magnetic field sensors acting as a magnetometer or by an array of magnetometers. From the antenna 24, a signal processing unit 26 with receiver electronics 28 conditions the scattered signals 22 in preparation for digital processing of the information. This information is processed using a computer 30 with an A/D converter or equivalent dedicated digital circuitry and wherein the diagnostic characteristics of the time constant of the metal object's total response curve is analyzed using a software code. The software code is capable of determining time constants and the measuring various signal cross-sections of the objects under observation.

The signal processing system using the computer 30 must accomplish three things, they are:

1. An accurate determination of the total response curve of the scattered signals 22.
2. Computation of the diagnostic characteristics embedded in the signal 22 and including the magnetization parameter, the crossover point and the time constant for the induction parameter.
3. Determination of the nature of the metal object 20 scattering the signal 22 with that particular time constant.

Accurate determination of the signal 22 can best be accomplished through synchronous detection (averaging) of several signals caused by repeated application of the excitation field, along with application of appropriate linear and non-linear digital filtering schemes for which the design may be specific to the site when the new system is installed. It should be noted, rapid determination of the meaning of the signal 22 is of the essence in an effective security system, with a need to acquire and process data in a very short time being an essential part of the design of the system.

Ideally, data acquisition and processing of signals should be accomplished in a time not exceeding one second, though in some applications, times as long as several seconds may be appropriate. For a system operating at a basic frequency of 50 Hertz, 20 step excitations can be achieved in one-tenth of a second. It is expected that synchronous addition and linear filtering will be accomplished with an embedded analog-to-digital (A/D) convertor linked directly to a pre-programmed central processing unit (CPU) to yield a signal curve like the curve shown in FIG. 5 within at most a few microseconds following completion of the excitation cycle of the system, a time which will range from as little as 0.1 second to as great as several seconds.

Figure 3:
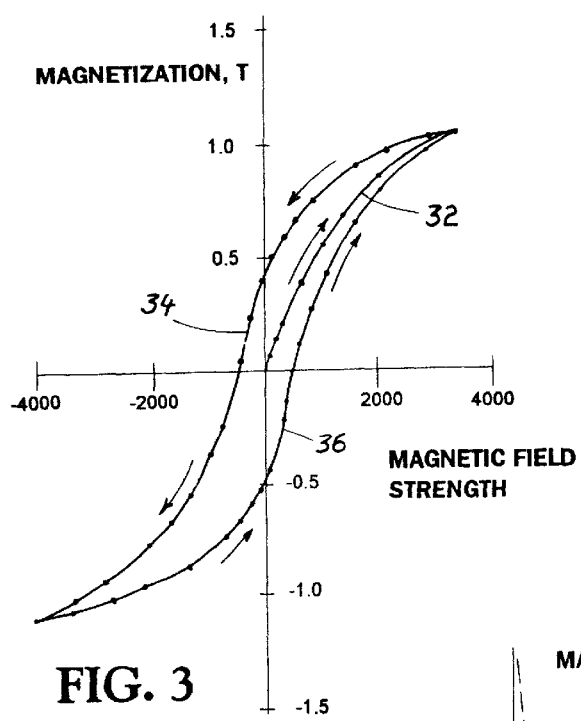
FIG. 3 is a graph of a curve relationship between magnetization and applied magnetic field strength in a typical ferromagnetic material.
Figure 4:
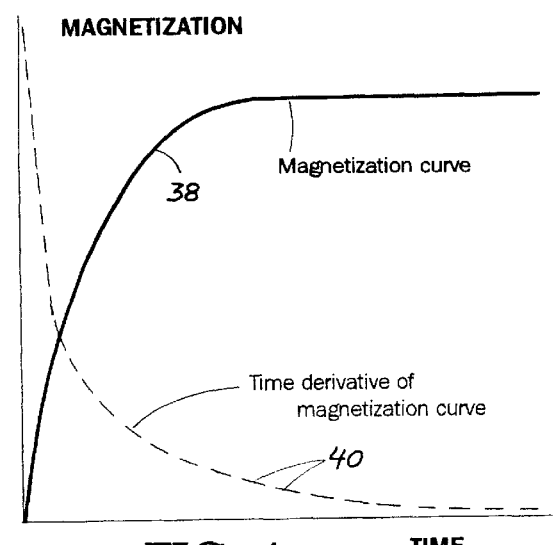
FIG. 4 is a graph of a curve of the magnetization of a ferromagnetic material subjected to a magnetic field Heaviside step pulse. The magnetization curve is shown in solid lines and the magnetization curve's time derivative is shown in dashed lines.

Referring now to FIGS. 3 and 4 and to the addition of the observation of the magnetization curve of the scattered signal 22, a brief review of the phenomenon of magnetization is as follows. It has long been recognized by physicists that the effect of a magnetic field on a material object is to generate magnetization with an addition of a magnetic field appearing around the object (Maxwell, J. C., 1891, A Treatise on Electricity and Magnetism, 3rd Edition: Constable and Company Ltd. London (republished in 1954 by Dover Publications, New York and Purcell, Edward M. 1963, Electricity and Magnetism, Berkeley Physics Course-Volume 2: McGraw-Hill, New York). This additional field is created by an alignment of elementary particles (atoms) in the material with an external magnetic field. The magnetization may increase the total magnetic field in the vicinity of the object being magnetized, or it may decrease it. Depending on the behavior with a specific material, materials are classified as being paramagnetic (the total magnetic field is increased by magnetization), diamagnetic (the total magnetic field is decreased by magnetization) and ferromagnetic (the total magnetic field is strongly increased).

The physical property of a material that characterizes the strength of magnetization is the magnetic susceptibility. If a material existed which exhibited no magnetization when in a magnetic field, its susceptibility would be unity or (1). In reality, this can only happen in a vacuum. In diamagnetic and paramagnetic materials, the susceptibility differs from unity by only tens of part per million. Measurement of magnetization of such small strengths probably is not useful in gun detection systems. On the other hand, susceptibilities in ferromagnetic materials differ from unity by a few percent and up to vary large factors in strongly magnetic alloys such as different types of steel used in weapon manufacturing. Because handguns almost always have components that are ferromagnetic, it seems quite possible that handguns can be distinguished from other non-ferromagnetic metal objects.

Referring now to FIG. 3, in ferromagnetic materials magnetization depends in a complex way on the transmitter's strength of the applied magnetic field and on its history. For example, if an object were initially in a region completely absent of a magnetic field, its magnetization would change with the transmitter's strength of the applied electromagnetic signals 14 as shown in FIG. 1. With the first application of the field, the magnetization will increase linearly, as shown as curve 32. But as the applied field becomes stronger, the rate of increase of magnetization slows. When the magnetization is reversed, the magnetization also is reversed. However, as the magnetization is reversed, a curve 34 does not follow the in initial curve 32 obtained by the first application of the field. With successive reversals of the applied field, the magnetization will follow a sigmoid pair of curves 34 and 36 as shown in FIG. 3. The phenomenon is known as magnetic hysteresis.

In FIG. 4, a graph of a curve 38 of the magnetization of the metal object 20 made of ferromagnetic material is shown. In this example, the object 20 is subjected to a magnetic field Heaviside step pulse. The magnetization curve 38 is shown in solid lines and the magnetization curve's time derivative 40 is shown in dashed lines. In the embodiment of this behavior in the improved weapon detection system 10, the magnetization and the eddy current field will normally be measured with a small induction coil or magnetometer which produces a voltage output that is proportional to the time-rate of change of the combined magnetic fields, that from the magnetization of the object and that accompanying the eddy current flow in the object 20. Electromagnetic theory guarantees that the two transients will be of opposite polarity.

Figure 5:
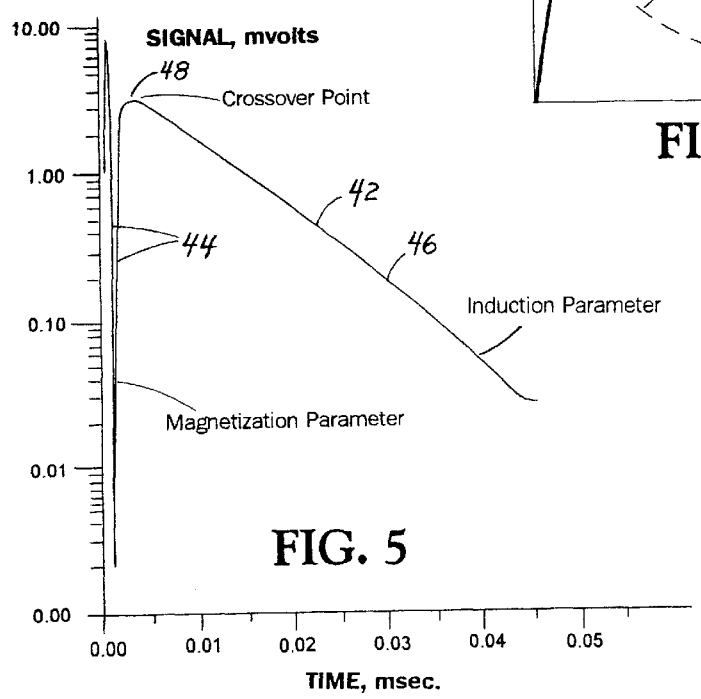
FIG. 5 illustrates a target response curve or step pulse of a Jennings 22 caliber handgun made of ferromagnetic material, such as steel. The curve includes a magnetization field signal or measurable magnetization parameter, a scattered eddy current signal or measurable induction parameter and a crossover time or a measurable crossover point of the step pulse.

In FIG. 5, a target response curve or step pulse of a Jennings 22 caliber handgun made of ferromagnetic material, such as steel, is illustrated. A step pulse curve 42 includes a magnetization field signal or measurable magnetization parameter curve 44, a scattered eddy current signal or measurable induction parameter curve 46 and a crossover time or a measurable crossover point 48 of the step pulse curve 42.

The levels of the two signals 44 and 46 depend on the geometric parameters such as the distance of the object 20 from the Heaviside step pulse transmitter 12, the transmitters strength, and the orientation of the object 20 as well as the magnetic properties of the object. Thus, the amplitudes of the two signals 44 and 46 give only very qualitative information about the object 20. However, these parameters 44, 46 and 48 can be derived and processed to separate non relevant factors from those which specifically separate non-guns from, in this example, the step pulse of the Jennings 22 caliber handgun made of ferromagnetic material.

Three informative and measurable factors can be identified which are independent of signal strength.

1. The "negativity" of the signal. The negativity of the signal is defined as the ratio of the lowest initial level of the step pulse curve 42 to the peak level or the crossover point 48 of the step curve 42. This quantity is unity for an object 20 which is not ferromagnetic, and hence, not a gun.
2. The "crossover time" or crossover point 48 of the step pulse curve 42 is defined as the delay time at which the signal 44 from the magnetization equals the signal 46 from the induction currents. With the use of a sensor that measures a time-rate of change of the magnetic field, the crossover time is the time at which the signal passes through an external. This quantity can be used to estimate the product of the electrical conductivity and the magnetic susceptibility, and hence, the metallic composition of the object.
3. The "slope" of the late part of the decay curve or the scattered eddy current signal 46, which is the ratio of signal strength at two points along the descending part of the signal. This quantity defines the scattering cross section of the object 20, which is in a general way a parameter related to the object's shape.

Experimental testing has shown that the above three mentioned measurable factors can be determined with sufficient accuracy to separate ferromagnetic objects that are weapons from other metal objects and non-metal objects under surveillance.

From the above mentioned three measured factors, reliable determination that a detected metal object is in fact a gun can be established.

If there in no negativity detected, it is very unlikely that the metal object 20 being observed is a gun. Therefore, the computer analysis, using the computer 30, can immediately indicate a "no risk" target and no further analysis is required.

If there is negativity to the detected signal, the likelihood that the signal is from a gun, and in particular some class of gun, the class being calibre, size, weight, etc., can be done using the slope of the magnetization parameter signal 44 and the crossover point 48. Both are dimensionless parameters, requiring no additional information such as signal strength or location of the metal object 20 in the volume 18 being searched.

Theory shows that the slope of the magnetization parameter signal 44 is related by a simple algebraic formula to a quantity known in electromagnetic theory as "cross section" and is a measure of the size and shape of the target. The crossover point 48 is the point on the step pulse curve 42 at which the time rate of change of the magnetization of the metal object 20 equals the time rate of change of the eddy current density. Also, theory shows that the ratio of these two quantities depends algebraically only on the ratio of the magnetic susceptibility of the metal object 20 to its electrical conductivity. This ratio is a sensitive indicator of the metallurgical composition of the object.

A decision as to the probable nature of the detected target can be made based on the size/shape factor and the metallurgical composition with considerable confidence. For rapid decision making, perhaps the best approach is to search a data base in the computer 30 wherein these numbers have been compiled for all sorts of guns and various types of weapons. Many standard approaches to a rapid search of a two-parameter data-base are available and well known in the art and need not be discussed herein.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A non-obtrusive weapon detection system for detection of and discrimination between a concealed ferromagnetic weapon and other objects, the system comprising:
   a transmitter for transmitting low intensity electromagnetic step pulses, the step pulses creating a combination of a magnetization field signal and a scattered eddy current signal with a crossover point in the metal object under observation;
   a receiver for detecting said magnetization field signal, said eddy current signal and said crossover point; and
   data processing and computing equipment means connected to said receiver, said data processing and computing equipment means digitally processing the combination of said magnetization field signal and said scattered eddy current signal with said crossover point for defining a crossover time constant, the processed information of said crossover time constraint providing an accurate determination of the metallurgical composition of the object under surveillance using appropriate mathematical equations, the processed information allowing an observer to identify objects that are threatening and non-threatening.

2. The weapon detection system as described in claim 1 wherein said transmitter transmits repeated step pulse signals causing repeated magnetization field signals and eddy currents with crossover points to flow in the metal object under observation and creating additional step pulse signals which are digitally processed and synchronously averaged for defining said crossover time constant and providing increased accuracy in the determination of the object under observation.

3. The weapon detection system as described in claim 1 wherein said data processing and computing equipment means includes an embedded analog-to-digital (A/D) converter linked directly to a preprogrammed central processing unit (CPU) for synchronous averaging and linear filtering to yield said step pulse signals in a range of 1 to 10 microseconds following completion of the transmission of the step pulse signals in a range of 0.1 to 2 seconds.

4. The weapon detection system as described in claim 1 wherein said data processing and computing equipment means is used for comparing said crossover time constant of said step pulse signals of the metal object under observation with similar values of crossover time constants and various signal cross-sections of other objects contained in a data base of the said computing equipment means to predict the nature of the metal object under observation and allow an observer to identify the metal object as being threatening or non-threatening.

5. The weapon detection system as described in claim 1 wherein said transmitter is a magnetic field generator used for transmitting low intensity electromagnetic step pulse signals in a range of 20 to 50 pulse signals per second.

6. The weapon detection system as described in claim 1 wherein said receiver is a plurality of fast response magnetic field sensors.

7. The weapon detection system as described in claim 1 wherein said receiver is a loop receiver antenna.

8. A non-obtrusive weapon detection system for detection of and discrimination between a concealed ferromagnetic weapon and other metal objects, the system comprising:
- a transmitter for transmitting low intensity electromagnetic step pulse signals, the step pulse signals creating magnetization field signals in the metal object under observation;
- a receiver for detecting said magnetization field signals; and
- data processing and computing equipment means connected to said receiver, said data processing and computing equipment means digitally processing said magnetization field signals for defining a diagnostic characteristic of a magnetization time constant, the processed information of the magnetization time constant providing an accurate determination of a relationship to the conductive properties of the object under surveillance and the size and shape of the object using appropriate mathematical equations, the processed information allowing an observer to identify objects that are threatening and non-threatening.

9. The weapon detection system as described in claim 8 wherein said transmitter transmits repeated step pulse signals causing repeated magnetization field signals to flow in the metal object under observation and creating additional step pulse signals which are digitally processed and synchronously averaged for defining said magnetization time constant and providing increased accuracy in the determination of the object under observation.

10. The weapon detection system as described in claim 8 wherein said data processing and computing equipment means includes an embedded analog-to-digital (A/D) converter linked directly to a preprogrammed central processing unit (CPU) for synchronous averaging and linear filtering to yield said step pulse signals in a range of 1 to 10 microseconds following completion of the transmission of the step pulses in a range of 0.1 to 2 seconds.

11. The weapon detection system as described in claim 8 wherein said data processing and computing equipment means is used for comparing the magnetization time constant of said step pulse signals of the metal object under observation with similar values of time constants of other objects contained in a data base of the said computing equipment means to predict the nature of the metal object under observation and allow an observer to identify the metal object as being threatening or non-threatening.

12. The weapon detection system as described in claim 8 wherein said transmitter is a magnetic field generator used for transmitting low intensity electromagnetic step pulse signals in a range of 20 to 50 pulses per second.

13. The weapon detection system as described in claim 8 wherein said receiver is a plurality of fast response magnetic field sensors.

14. A non-obtrusive weapon detection system for detection of and discrimination between a concealed ferromagnetic weapon and other objects, the system comprising:
- a transmitter for teasting low intensity electromagnetic step pulses, the step pulses a combination of a magnetization field signal and a scattered eddy current signal in the metal object under observation;
- a receiver for detecting said magneization field signal, said eddy current signal; and
- data processing and computing equipment means connected to said receiver, said data processing and computing equipment means digitally processing the combination of said magneization field signal and said eddy current signal for defining a combined signal time constant, the processed information of said combined signal time constant providing an accurate determination of the metallurgical composition of the object under surveillance using appropriate mathematical equations, the processed information allowing an observer to identify objects that are threatening and non-threatening.

15. The weapon detection system as described in claim 14 wherein said transmitter transmit repeated step pulse signals causing repeated magnetization field signals and eddy currents to flow in the metal object under observation and creating additional step pulse signals which are digitally processed and synchronously averaged for defining the combined signal time constant and providing increased accuracy in the determination of the object under observation.

16. The weapon detection system as described in claim 14 wherein said data processing and computing equipment means includes an embedded analog-to-digital (A/D) converter linked directly to a preprogrammed central processing unit (CPU) for synchronous averaging and linear filtering to yield said step pulse signals in a range of 1 to 10 microseconds following completion of the transmission of the step pulse signals in a range of 0.1 to 2 seconds.

17. The weapon detection system as described in claim 14 wherein said data processing and computing equipment means is used for comparing the combined time constant of said step pulse signals of the metal object under observation with similar values of time constants and various signal cross-sections of other objects contained in a data base of the said computing equipment means to predict the nature of the metal object under observation and allow an observer to identify the metal object as being threatening or non-threatening.

18. The weapon detection system as described in claim 14 wherein said transmitter is a magnetic field generator used for transmitting low intensity electromagnetic step pulse signals in a range of 20 to 50 pulse signals per second.

19. The weapon detection system as described in claim 14 wherein said receiver is a plurality of fast response magnetic field sensors.

20. The weapon detection system as described in claim 14 wherein said receiver is a loop receiver antenna.

* * * * *